United States Patent [19]
Clayton et al.

[11] Patent Number: 5,388,210
[45] Date of Patent: Feb. 7, 1995

[54] PROGRAMMABLE MODULAR NETWORK INTERFACE FOR COUPLING A COMPUTER AND A PLURALITY OF WORKSTATION CONSOLES

[75] Inventors: Terry R. Clayton; Andrew W. Lepp, both of Fredericksburg, Va.

[73] Assignee: The United States of America as represented by the Secretary of the Navy, Washington, D.C.

[21] Appl. No.: 63,227

[22] Filed: May 17, 1993

[51] Int. Cl.$^6$ ............................................. G06F 13/00
[52] U.S. Cl. ................... 395/200; 364/222.2; 364/239.4; 364/284.1; 364/DIG. 1; 370/94.1
[58] Field of Search ............ 395/200; 370/56, 60, 370/94.1, 94.2, 94.3, 92; 364/222.2, 239.4, 284.1

[56] References Cited

U.S. PATENT DOCUMENTS

| | | | |
|---|---|---|---|
| 4,899,274 | 2/1990 | Hansen et al. | 364/200 |
| 5,166,931 | 11/1992 | Riddle | 370/94.1 |
| 5,204,950 | 4/1993 | Kawashima | 395/200 |
| 5,287,103 | 2/1994 | Kasprzyk et al. | 370/94.1 |
| 5,287,461 | 2/1994 | Moore | 395/200 |
| 5,293,488 | 3/1994 | Riley et al. | 395/200 |

OTHER PUBLICATIONS

"Local Networks", by William Stallings, 1990, pp. 381–384 & pp. 389–392.

*Primary Examiner*—Thomas C. Lee
*Assistant Examiner*—Moustafa Mohamed Meky
*Attorney, Agent, or Firm*—Jacob Shuster

[57] ABSTRACT

A modular system for interfacing between a Navy standard UYK-43 computer and a plurality of workstation consoles connected to a control data bus is provided. A first conversion processor is functionally connected to the computer and functionally connected to a backplane. A second conversion processor is functionally connected to the computer and functionally connected to the backplane. The second conversion processor also includes memory for storing status and action information associated with each of the consoles. A system processor is functionally connected to the backplane and a local area network (LAN) processor is functionally connected to the backplane and to the consoles,

3 Claims, 1 Drawing Sheet

PROGRAMMABLE MODULAR NETWORK INTERFACE FOR COUPLING A COMPUTER AND A PLURALITY OF WORKSTATION CONSOLES

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to network interfaces, and more particularly to a modular design, programmable network interface that finds particular utility as an interface between the U.S. Navy standard UYK-43 shipboard computer and a plurality of workstations or consoles serviced by the computer.

BACKGROUND OF THE INVENTION

As in all technology related businesses, the U.S. Department of Defense is faced with many difficult decisions in choosing methods of upgrading current control systems to keep pace with technology while operating within ever tightening budget constraints. Realistic assessments of these decisions indicate that wholesale replacement of electronic systems currently used will be impossible. It is therefore necessary to explore novel ways of selectively inserting advanced capabilities and technologies into existing systems to thereby extend the useful life of the overall system while increasing its technical capability. The most cost effective way to accomplish this is to utilize non-development items that are readily available/used in the commercial world. Unfortunately, many of the military's current combat systems are based on proprietary equipment designed and built for specific applications.

In the U.S. Navy, many of these proprietary systems are arranged in a centralized architecture having many point-to-point interconnections. For example, as shown in FIG. 1, the current generation Navy standard shipboard computer 10 (UYK-43) is point-to-point connected to a plurality of specially designed AN/UYQ-21(V) workstations or consoles 30 by means of a specially designed central data buffer 20. Central data buffer 20 passes commands, data and status information between computer 10 and consoles 30. This configuration limits the Navy's options when it comes to system upgrade since each component of the system involves expensive proprietary equipment.

SUMMARY OF THE INVENTION

Accordingly, it is an object of the present invention to develop computer system components based on commercially available technology that are adaptable to a wide variety of applications.

Another object of the present invention is to develop a modular system for interfacing between existing system architecture components such that each module of the system can be focused on the design needs of the system architecture with which it interfaces.

Yet another object of the present invention is to develop a modular system for interfacing between the Navy standard UYK-43 computer and a plurality of workstation consoles which it services.

Other objects and advantages of the present invention will become more obvious hereinafter in the specification and drawings.

In accordance with the present invention, a modular system for interfacing between a Navy standard UYK-43 computer and a plurality of workstation consoles connected to a control data bus is provided. The UYK-43 computer has separate MIL-STD-1397 Navy tactical data system (NTDS) serial input and output ports that receive and send, respectively, NTDS level serial format data. A first conversion processor is functionally connected directly to the output port of the computer and functionally connected to a backplane. A second conversion processor is functionally connected directly to the input port of the computer and functionally connected to the backplane. The second conversion processor also includes memory for storing status and action information associated with each of the consoles. A system processor is functionally connected to the backplane and a local area network (LAN) processor is functionally connected to the backplane and to the consoles.

In operation, computer messages sent from the computer are received by the first conversion processor where they are converted from NTDS level serial format to transistor-transistor-logic (TTL) level parallel format. The first conversion processor processes the converted computer messages to identify them as being one of a console designated message or an interrogation message, and outputs the converted computer messages onto the backplane. The second conversion processor retrieves interrogation messages and accesses the status and action information maintained in the memory to output a response to the computer. The system processor intercepts console designated messages and segregates them based on a corresponding console destination address indicative of one of the consoles. The corresponding console destination address is included as part of each console designated message. The system processor outputs segregated console designated messages and the corresponding console destination addresses onto the backplane. The LAN processor receives the segregated console designated messages and the corresponding console destination addresses and routes same to a designated one of the consoles based upon the corresponding console destination address.

Console messages sent from the consoles are received by the LAN processor and output onto the backplane in the TTL level parallel format. The system processor intercepts the console messages and segregates them based upon a corresponding console origination address. The corresponding console origination address is included as part of each console message. The system processor outputs the console messages and corresponding console origination addresses to the second conversion processor via the backplane. The second conversion processor updates the status and action information in the memory using the segregated console messages and the corresponding console origination addresses. The second conversion processor converts the segregated console messages and the corresponding console origination addresses from the TTL level parallel format to the NTDS level serial format when responding to an interrogation message.

DETAILED DESCRIPTION OF THE INVENTION

Figure 1:
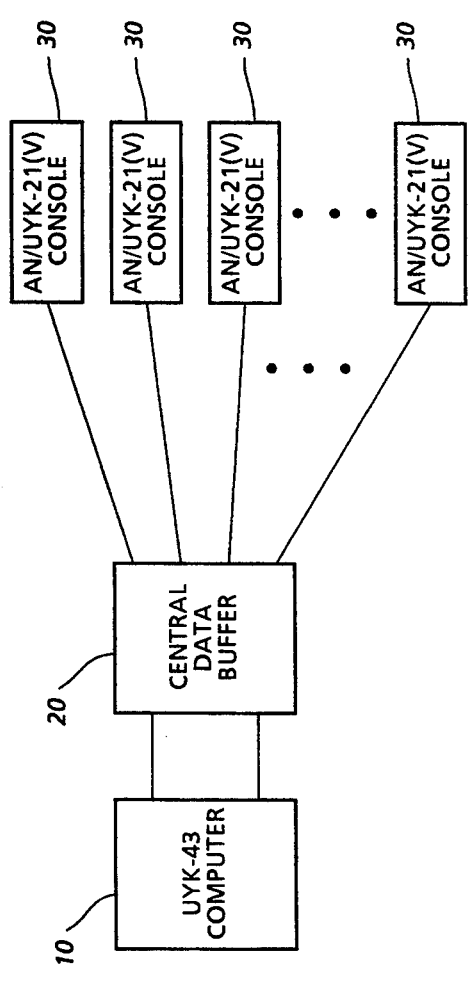
FIG. 1 is a prior art functional block diagram showing the point-to-point connection between a U.S. Navy standard UYK-43 shipboard computer and a plurality of workstation consoles via a specially designed central data buffer.
Figure 2:
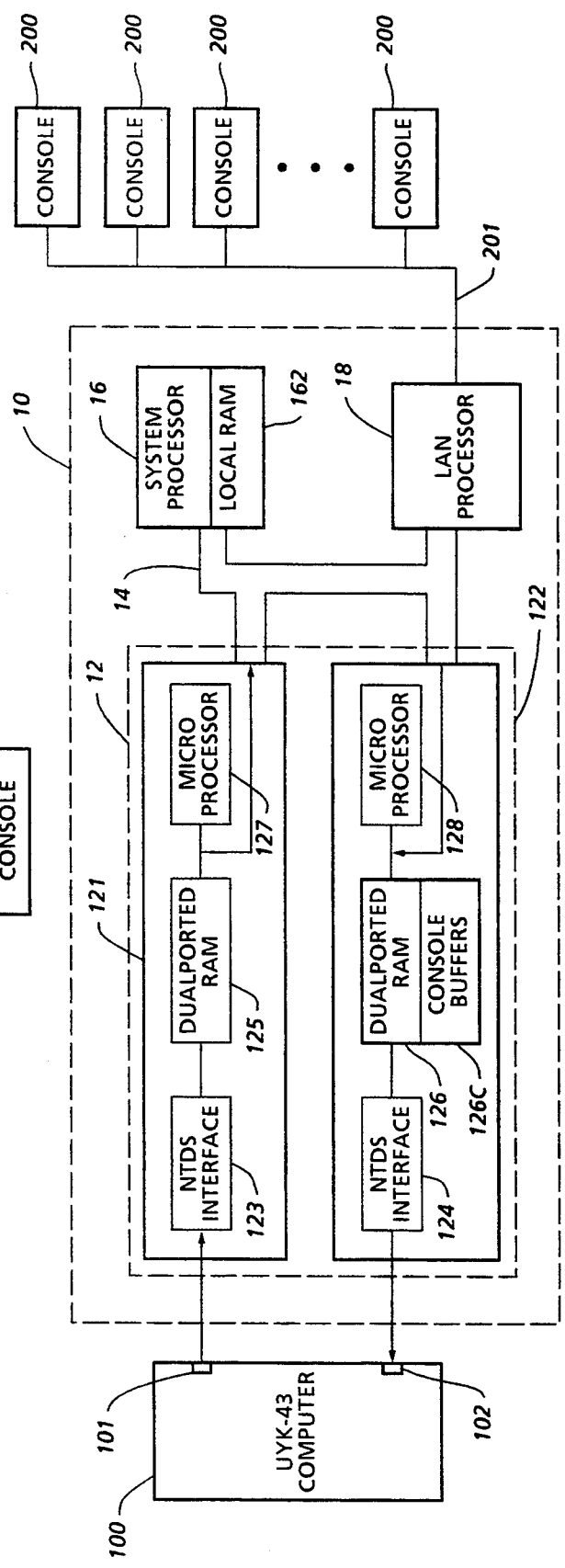
FIG. 2 is a functional block diagram of a modular system according to the present invention that serves as a programmable interface between a central computer and a plurality of workstations or consoles.

Referring now to the drawings, and more particularly to FIG. 2, a functional block diagram is shown of a modular system 10 that interfaces between a central computer 100 and a plurality of standard, commercially available workstations or consoles 200, the choice of which are not limitations on the present invention. By way of example, modular system 10 will be described with respect to its operation with the Navy's standard UYK-43 shipboard computer as central computer 100. Thus, modular system 10 and consoles 200 replace central data buffer 20 and the AN/UYQ-21(V) consoles 200, respectively, shown in FIG. 1. However, it will be understood by one of ordinary skill in the art that modular system 10 may be readily adapted as an interface between other central computer and/or standard console designs.

Modular system 10 includes a central data buffer emulation processor (CDBEP) 12, a system backplane 14, an extraction or system processor 16 and a local area network (LAN) processor 18. Since modular system 10 is to have no impact on the existing central computer 100 and consoles 200, it must operate with the established timing and communication protocols of central computer 100 and consoles 200, respectively. Modular system 10 must also provide for the proper routing of data between central computer 100 and consoles 200.

The UYK-43 computer 100 is provided with a plurality of separate serial input and output ports (only output port 101 and input port 102 are shown) that transfer single words of data in a serial fashion in accordance with voltage levels set by the MIL-STD-1397 Navy tactical data system (NTDS). For sake of simplicity, the term "data" as used herein refers to both control information and data information passing from and to UYK-43 computer 100. Voltage levels handled by UYK-43 computer 100 include Types A-E specified by MIL-STD-1397. By way of example, it will be assumed that Type E specification data passes over output port 101 and input port 102. Since this form of data communication is not found outside the military venue, it is first necessary for modular system 10 to provide a serial interface within CDBEP 12. Specifically, CDBEP 12 includes an interpreter block 121 and a responder block 122. Interpreter 121 includes an NTDS (Type-E) interface 123 for receiving single word, low level serial data from output port 101 of UYK-43 computer 100 and for converting the received data into standard transistor-transistor-logic (TTL) level data. A dual-ported random access memory (RAM) 125 and microprocessor 127 are also provided to convert the incoming serial data stream into a parallel format to improve processing speed within modular system 10. Microprocessor 127 controls the clocking of serial data into RAM 125 from interface 123 and out of RAM 125 in parallel format onto system backplane 14. Accordingly, system backplane 14 is a backplane capable of handling parallel data transfer such as the Versa Module European (VME) backplane.

In a similar fashion, responder 122 includes RAM 126 and microprocessor 128 for clocking parallel format data received on system backplane 14 into RAM 126 and for clocking a serial data stream out of RAM 126 which is then input to NTDS (Type E) serial interface 124. Interface 124 converts the incoming serial data stream back to the single word, low-level serial format accepted by input port 102 of UYK-43 computer 100. In addition, as will be explained further hereinbelow, a portion of RAM 126 is reserved for storing status and action information associated with each console 200. This portion of RAM 126 will be referred to as console buffers 126C. Status information is indicative of a particular console's current state (e.g., idle, busy, etc.). Action information is information conveyed by a particular console's action (e.g., button action, trackball coordinates, etc.).

Since both interpreter 121 and responder 122 must be tailored to the specific and possibly changing timing and protocol requirements of the selected central computer, it is desirable that both interpreter 121 and responder 122 be programmable. One such commercially available programmable processor that also accomplishes Type E conversion is the model HAWKE VME NTDS Type E from Sabtech Industries.

System processor 16 initiates and controls all processes within modular system 10 and serves as the interface between CDBEP 12 and LAN processor 18. Further, system processor 16 includes local RAM 162 for buffering data from both computer 100 and consoles 200 as it passes through modular system 10. In this way, system processor 16 is able to absorb all timing differences between UYK-43 computer 100 and consoles 200. This is especially important in the case of the UYK-43 computer since it has no "WAIT" or "BUSY" signals available for timing synchronization/flow control. By way of example, one such microcomputer that will function with the VME backplane is the model MVME-147 manufactured by Motorola, Inc.

System processor 16 segregates and filters the bulk parallel data stream passed on backplane 14. The bulk data contains interspersed data and control instructions for all of the possible consoles 200. The bulk data is split into separate buffers within local RAM 162 based on the equipment address of the designated console from UYK-43 computer 100. The data in the buffers of RAM 162 is then passed over backplane 14 to LAN processor 18.

LAN processor 18 is the network interface between modular system 10 and consoles 200 that handles all data traffic to and from consoles 200. By way of example, one such LAN processor that will function with the VME backplane is the model HK68/V30XE manufactured by Huerikon. In terms of data traffic being sent to consoles 200, LAN processor 18 accepts buffered data packets from system processor 16 and performs an address translation between the equipment address identification provided by UYK-43 computer 100 to an address identification recognized by the data bus 201 connecting modular system 10 with consoles 200. Data bus 201 may comprise any standard data bus such as an Ethernet. The address identification passed on data bus 201 designates the particular console for which the data and/or control instructions are destined.

In terms of data traffic sent from consoles 200, LAN processor 18 translates operator console actions (e.g., keystrokes, button actions, trackball motion, etc.) received from consoles 200 to the associated information for UYK-43 computer 100. Specifically, addresses passed on data bus 201 are converted to the appropriate console equipment address. The console equipment address along with the associated console action are passed to system processor 16 which stores the action in the appropriate console buffer 126C in responder 122. The action is then available to UYK-43 computer 100 during the next interrogation cycle.

Process flow through modular system 10 will now be described for:
1) UYK-43 data transfer to a console;
2) A console action sent to the UYK-43; and
3) A UYK-43 interrogation of a console.

1) UYK-43 Data Transfer to a Console

Interpreter 121 receives a message from UYK-43 computer 100 and determines if the message is data destined for a console or a console interrogation. Assuming that the message is data destined for a console, interpreter 121 passes the data over backplane 14 to system processor 16. The data is then segregated and filtered into the proper buffer of local RAM 162 based on the equipment address identification provided by UYK-43 computer 100. When a buffer of local RAM 162 is filled (or if a predetermined time has passed), the buffered data is passed over backplane 14 to LAN processor 18 where it is translated into an appropriate format (in terms of console address and the data format therefor) for transmission over data bus 201 to a designated one of consoles 200. Note that responder 122 does not participate in this operation and is therefore free to perform other system tasks.

2) Console Action Sent to UYK-43

When a console action takes place at one of consoles 200, the action is transmitted over data bus 201 to LAN processor 18 where it is translated from the "console format" to the UYK-43 "computer" format. Specifically, the address of the action originating console is translated to the equipment address identification utilized by UYK-43 computer 100. The translated console action is passed to system processor 16 over backplane 14. System processor 16 assigns the appropriate memory address in console buffer 126C based on the equipment address identification utilized by UYK-43 computer 100. The data associated with the console action is stored in the appropriate console buffer 126C for the next interrogation cycle by UYK-43 computer 100. Note that interpreter 121 is not required to participate in this operation and is therefore free to perform other system tasks.

3) UYK-43 Interrogation of a Console

A message from UYK-43 computer 100 is received by interpreter 121. Assuming that the message is determined to be a console interrogation, the equipment address identification provided by UYK-43 computer 100 associated with the interrogation is transferred to responder 122 via backplane 14. Responder 122 simply retrieves the response stored in the appropriate console buffer 126C based on the equipment address identification provided by UYK-43 computer 100. The response (i.e., status or action information associated with a particular console) is passed directly from responder 122 to input port 102 of UYK-43 computer 100 to complete the interrogation process. Note that both system processor 16 and LAN processor 18 are free to perform other system tasks during the interrogation cycle.

The advantages of the present invention are numerous. The modularity of its design allows for future advancement of both the central computer and consoles with which the computer must communication. Advancement of the components being interfaced only requires updates at the particular module that is affected. Further, use of readily available programmable modules allow the system to be built and customized at a cost that is less than developing a proprietary interface. The programmable nature of each module further provides the ability to provide minor enhancements via software updates as opposed to hardware changes. Finally, since each module includes its own "local" processing capability, the "local" processing could be expanded, tapped for debugging and analysis purposes, and serve as a means for receiving emulation data for testing purposes.

Although the invention has been described relative to a specific embodiment thereof, there are numerous variations and modifications that will be readily apparent to those skilled in the art in light of the above teachings. Indeed, the modular concept may be expanded for a range of interface conversions based on both military and industry standards. It is therefore to be understood that, within the scope of the appended claims, the invention may be practiced other than as specifically described.

What is claimed as new and desired to be secured by Letters Patent of the United States is:

1. A modular system for interfacing between a computer and a plurality of workstation consoles connected to a control data bus, said computer having serial input and output ports that receive and send, respectively, data in accordance with a predetermined format, said consoles having input and output ports that receive and send, respectively, data in a format other than said predetermined format, said system comprising:

a backplane for passing transistor-transistor-logic (TTL) format data;

first conversion processor means connected to said output port of said computer and to said backplane for classifying said predetermined format data received from said computer as an interrogation message or a console designated message which includes a corresponding console destination address indicative of one of said plurality of consoles, said first conversion processor means further converting said console designated message or said interrogation message into the TTL format data passed by said backplane;

second conversion processor means connected to said input port of the computer and to said backplane for retrieving said interrogation message from said backplane and accessing information associated with each of the consoles to output a response to the interrogation message to said computer in accordance with said predetermined format;

a system processor connected to said backplane, including buffer memory means for providing indexed buffering of said console designated message based on said corresponding console designated address and passing said console designated message onto said backplane in accordance with programmable timing;

local area network (LAN) processor means connected to said backplane and connected to said consoles via said control data bus for converting said console designated message from said buffer memory means into said format other than said predetermined format and distribution thereof on said control data bus to a designated one of said plurality of consoles based upon said corresponding console destination address;

said LAN processor means further converting said data sent from said plurality of consoles to said TTL format, said data sent from said plurality of consoles including a corresponding console origination address identifying a particular one of said plurality of consoles as a source of said data sent from said plurality of consoles;

said system processor further having means for providing indexed buffering of said data sent from said plurality of consoles in said TTL format based on said corresponding console origination address and passing said data sent from said plurality of consoles in said TTL format from said buffer memory means onto said backplane in accordance with programmable timing; and said second conversion processor means including memory means for storing said information associated with each of the consoles being accessed and updating said stored information using said data sent from said plurality of consoles from said buffer memory means.

2. A modular system for interfacing between a computer and a plurality of workstation consoles connected to a control data bus, said computer having U.S. Navy tactical data system (NTDS) serial input and output ports that receive and send, respectively, NTDS level serial format data, said consoles having input and output ports that receive and send, respectively, data in a format other than NTDS level serial format, said system comprising:

a backplane for passing transistor-transistor-logic (TTL) level parallel format data;

a first conversion processor, connected to said output port of said computer and to said backplane, for classifying NTDS level serial format data received from said computer as being one of a console designated message or an interrogation message, said console designated message including a corresponding console destination address indicative of one of said plurality of consoles, said first conversion processor converting said one of said console designated message or said interrogation message into TTL, level parallel format for output onto said backplane;

a second conversion processor, connected to said input port of said computer and to said backplane, said second conversion processor including memory for storing information associated with each of said consoles, said second conversion processor retrieving said interrogation message from said backplane and accessing said information stored in said memory to output a response to said interrogation message to said computer, said response being NTDS level serial format;

a system processor connected to said backplane, said system processor including buffer memory for providing indexed buffering of said console designated message based on said corresponding console designated address, said system processor passing said console designated message from said buffer memory onto said backplane in accordance with programmable timing;

a local area network (LAN) processor connected to said backplane and connected to said consoles via said control data bus, said LAN processor converting said console designated message from said buffer memory into said format other than NTDS level serial format data for distribution on said control data bus to a designated one of said plurality of consoles based upon said corresponding console destination address:

said LAN processor further converting said data sent from said plurality of consoles to said TTL level parallel format, said data sent from said plurality of consoles including a corresponding console origination address identifying a particular one of said plurality of consoles as the source of said data sent from said plurality of consoles:

said system processor providing indexed buffering of said data sent from said plurality of consoles in said TTL level format based on said corresponding console origination address, said system processor passing said data sent from said plurality of consoles in said TTL level format from said buffer memory onto said backplane in accordance with programmable timing; and said second conversion processor updating said information in said memory using said data sent from said plurality of consoles from said buffer memory.

3. A modular system as in claim 2 wherein said first and second conversion processors, said system processor and said LAN processor are programmable.

* * * * *